US010744604B2

(12) United States Patent
Wagner (10) Patent No.: US 10,744,604 B2
(45) Date of Patent: Aug. 18, 2020

(54) METHODS AND SYSTEMS FOR FASTENING COMPONENTS

(71) Applicant: Palletec, LLC, Fridley, MN (US)

(72) Inventor: Paul Howard Wagner, Columbia Heights, MN (US)

(73) Assignee: Palletec, LLC, Fridley, MN (US)

( * ) Notice: Subject to any disclaimer, the term of this patent is extended or adjusted under 35 U.S.C. 154(b) by 98 days.

(21) Appl. No.: 15/910,048

(22) Filed: Mar. 2, 2018

(65) Prior Publication Data
US 2018/0272480 A1    Sep. 27, 2018

Related U.S. Application Data

(60) Provisional application No. 62/476,203, filed on Mar. 24, 2017.

(51) Int. Cl.
| | | |
|---|---|---|
| *B23P 19/04* | (2006.01) | |
| *F16B 12/54* | (2006.01) | |
| *B65G 17/42* | (2006.01) | |
| *B65G 17/12* | (2006.01) | |
| *B65G 17/16* | (2006.01) | |
| *B65G 17/44* | (2006.01) | |
| *A47C 19/02* | (2006.01) | |
| *B27F 7/17* | (2006.01) | |

(52) U.S. Cl.
CPC .............. *B23P 19/04* (2013.01); *B65G 17/12* (2013.01); *B65G 17/16* (2013.01); *B65G 17/42* (2013.01); *B65G 17/44* (2013.01); *F16B 12/54* (2013.01); *A47C 19/021* (2013.01); *B27F 7/17* (2013.01)

(58) Field of Classification Search
CPC ......... B23P 19/04; B65G 17/12; B65G 17/42; B65G 17/44; B65G 17/16; F16B 12/54; B27F 7/17; A47C 19/021
See application file for complete search history.

(56) References Cited

U.S. PATENT DOCUMENTS

| | | | |
|---|---|---|---|
| 3,945,549 A | 3/1976 | Colson | |
| 4,782,989 A | 11/1988 | Wallin et al. | |
| 4,824,004 A * | 4/1989 | Hanson | B23P 19/04 |
| | | | 227/152 |
| 4,867,364 A | 9/1989 | Wallin et al. | |

(Continued)

OTHER PUBLICATIONS

Viking Engineering & Development, Viking Service, Skute Parts Book, Dec. 2013, 37 pages, Viking Engineering & Development, Fridley, MN.

*Primary Examiner* — Moshe Wilensky
(74) *Attorney, Agent, or Firm* — Cozen O'Connor (57) ABSTRACT

Bed foundation beams are sandwiched by a compression bar extending parallel to the first and second rails and moved towards the first and second rails while being conveyed. Further, the first and second rails and the spacers are sandwiched against spaced fixtures on an endless chain. While being compressed and sandwiched, staple guns fasten the rails and spacers together. The fixtures include front and back stops, with the back stop pivotable about a fixture axis to be movable by a cam moving in a cam track from a pushing position extending perpendicular to the endless chain and abutting with a trailing edge of one of the spacers and a non-intervening position after the staple gun and before the sprocket of the endless chain to reduce the apparatus footprint.

5 Claims, 13 Drawing Sheets

(56) References Cited

U.S. PATENT DOCUMENTS

| | | |
|---|---|---|
| 5,052,307 A | 10/1991 | Morrison |
| 5,312,022 A | 5/1994 | Thompson et al. |
| 5,335,499 A | 8/1994 | Thompson et al. |
| 5,379,513 A | 1/1995 | Thompson et al. |
| 5,715,985 A | 2/1998 | Letson |
| 5,984,621 A | 11/1999 | Letson |
| 2012/0037753 A1* | 2/2012 | Huber .................. B64D 9/003 244/118.1 |
| 2015/0191923 A1* | 7/2015 | Weiszbrod ............. B23P 19/04 29/430 |

* cited by examiner

METHODS AND SYSTEMS FOR FASTENING COMPONENTS

BACKGROUND

Apparatus and methods for fastening components such as beams for bed foundations are shown and described.

Figure 2:
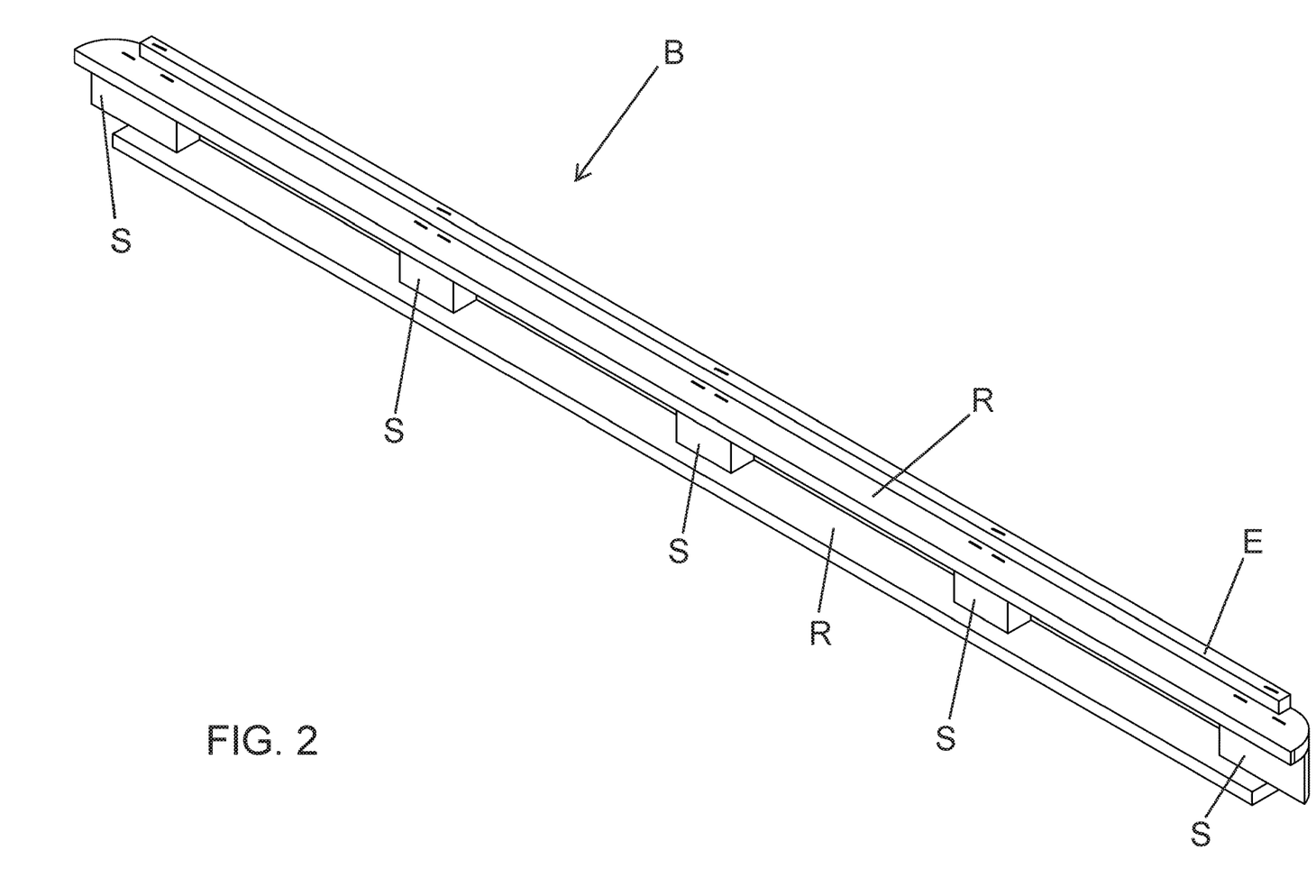
FIG. 2 shows a perspective view of a beam for bed foundations.

In the fabrication of bed foundations, it is necessary to fabricate side and center beams B by fastening spacers S between first and second rails R and an end stop E. Conventionally, after spacers S are fed from magazines M, an operator places rails R and end stop E on opposite sides thereof, and the unassembled rails R, end stop E and spacers S are conveyed in a direction parallel to the rails R and end stop E past staple guns G which drive staples through rails R and into spacers S and through end stop E and into first rail R. To reduce the spacing between the rails R, end stop E and spacers S, conventionally, the unassembled rails R, end stop E and spacers S were compressed together by funneling surfaces as the unassembled rails R, end stop E and spacers S were being conveyed. However, this resulted in several operational disadvantages including, but not limited to, jamming of the unassembled rails R, end stop E and spacers S when being conveyed, which required operator attention to unjam, and inconsistent fastening of the rails R, end stop E and spacers S. Further, the conveying mechanism was required to extend beyond the staple guns G for the complete length of the rails R, making the foot print of the apparatus significant.

Thus, there is a need for apparatus and methods for fastening components, such as rails and spacers, which overcome the operational disadvantages and reduce the required foot print.

SUMMARY

This need and other problems in the field of component fastening is solved by providing novel apparatus and methods for fastening components. A compression bar extends parallel to first and second rails received in spaced fixtures and being conveyed by a conveyor in a conveying direction to compress the first and second rails against spacers. Also, the first and second rails and the spacers are sandwiched against the spaced fixtures. Thus, jamming of the first and second rails and the spacers being conveyed to a gun for driving fasteners into the first and second rails and the spacers is avoided. In an aspect, the compression bar is moved by air cylinders connected between first and second arms extending perpendicularly from the compression bar and the apparatus frame. In another aspect, multiple claws having an extended shape perpendicular to their pivot axes are biased by air springs to abut with the first and second rails and the spacers while being conveyed.

Further, the fixtures include front and back stops which abut with leading and trailing portions of the first and second rails and the spacers while being conveyed in the conveying direction. The back stop is pivotable about a fixture axis and is movable between a pushing position extending generally perpendicular to the conveying direction and a non-intervening position extending at an acute angle to the endless chain of the conveyor. While components are being conveyed to a gun for driving fasteners into the components, the front stop abuts with the leading portion of the components, and the back stop is in the pushing position and abuts with the trailing portion of the components. After fastening and before the fixture reaches the sprocket of the endless chain, the back stop is pivoted to its non-intervening position to reduce the apparatus footprint. In an aspect, the back stop is pivoted by a cam fixed to an axle of the back stop which engages with a cam track extending parallel to the conveyor. In some aspects, the back stops of the fixtures abut with the trailing edges of the spacers. The front stop of one fixture is forwardly arcuately shaped to abut with the leading portion of the first and second rails and the spacers while the opposite ends of the first and second rails and the spacers abuts with a rearwardly arcuately shaped back stop of another, spaced fixture.

Illustrative embodiments will become clearer in light of the following detailed description in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "forward", "rearward", "reverse", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DESCRIPTION OF THE ILLUSTRATIVE EMBODIMENTS

Figure 1:
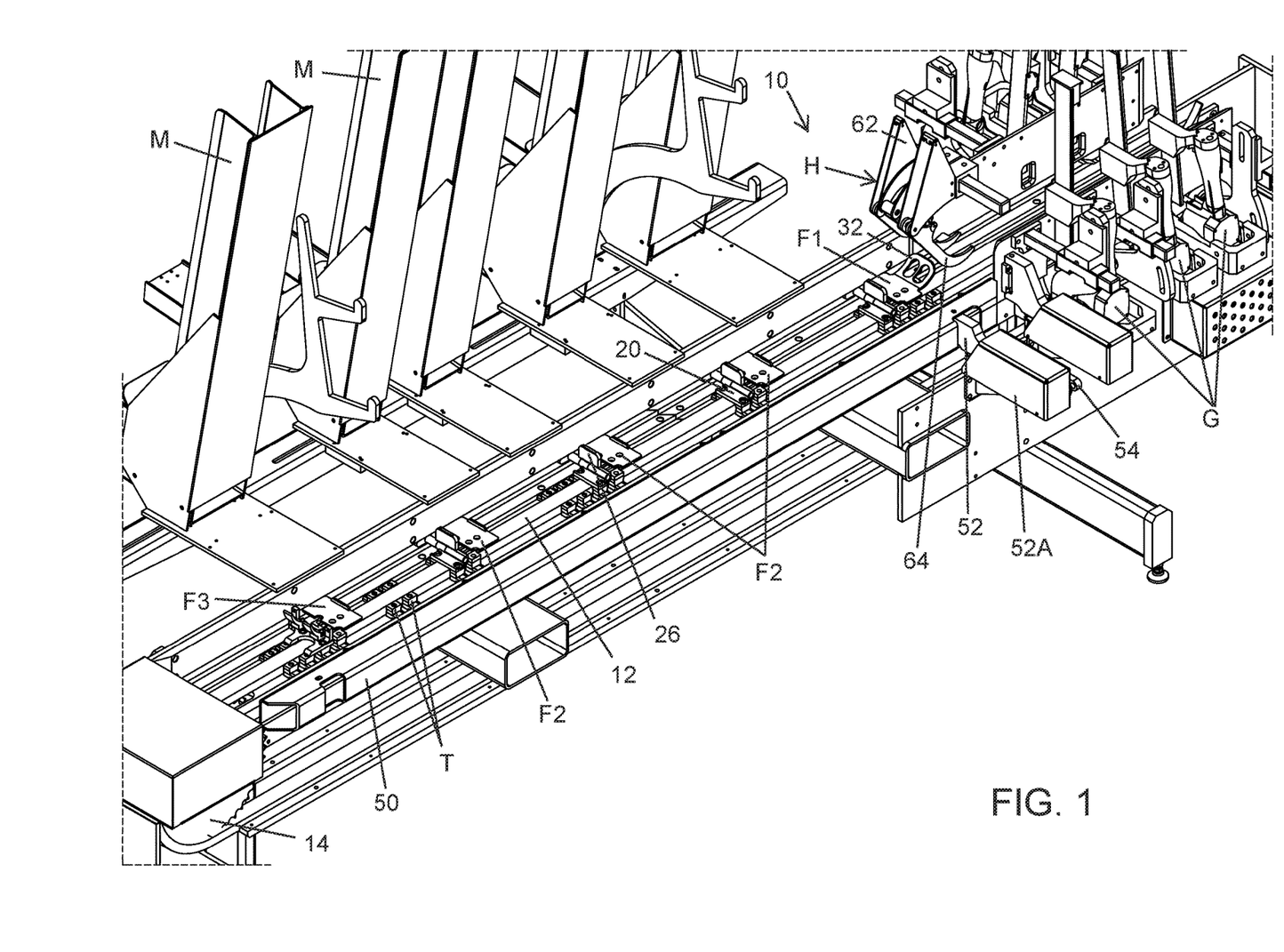
FIG. 1 shows a perspective view of an apparatus for fastening beams for bed foundations, with portions broken away and removed.
Figure 3:
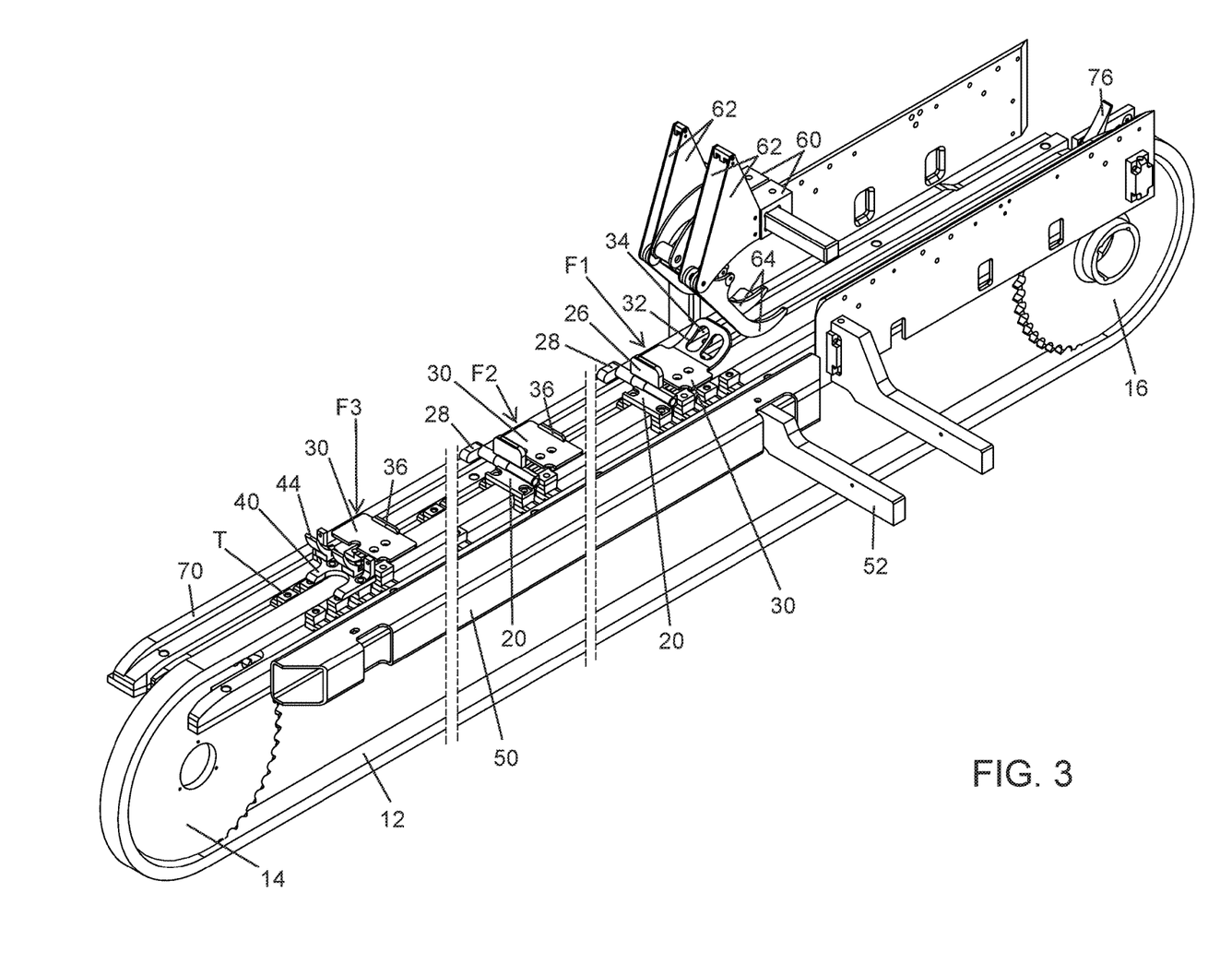
FIG. 3 shows a perspective view of the conveying mechanism of the apparatus of FIG. 1 with portions broken away and removed.
Figures 4, 5, 6, 7:
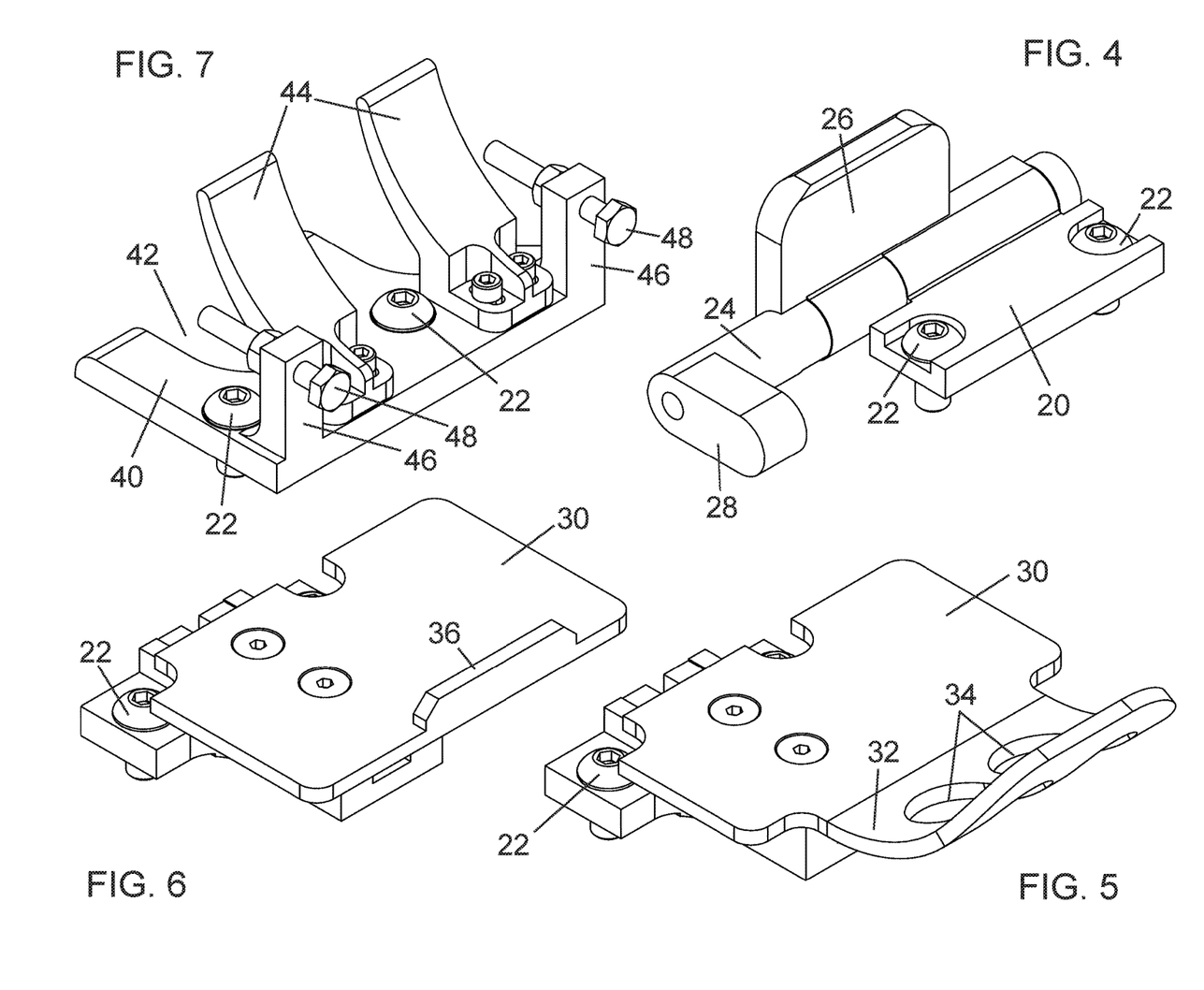
FIGS. 4-7 show perspective views of fixture elements of the apparatus of FIG. 1.

An apparatus for fastening components and particularly beams for bed foundations is shown and generally designated 10. Apparatus 10 generally includes a conveyor or conveying mechanism for conveying components in a conveying movement direction shown as an endless chain 12 extending around a sprocket 14 located before the magazines M in the conveying direction and a sprocket 16 located after the staple guns G in the conveying direction. In the form shown, endless chain 12 is formed of a single series of roller links L with some of the links L including tabs T extending in opposite directions from link L perpendicular to the conveying direction.

Conveying mechanism further includes fixtures F1, F2 and F3 attachable to tabs T of endless chain 12 and spaced in the conveying direction. It should be appreciated that fixtures F1, F2 and F3 can be attached to corresponding tabs T according to the particular length of rails R and spacing between spacers S of the particular bed foundation desired. In particular, fixtures F1 and F2 include a hinge mount 20 which can be removably attached to tabs T such as by fasteners 22. Hinge mount 20 includes an axle 24 rotatably mounted thereto about a fixture axis perpendicular to the conveying direction. A back stop shown as a push tab 26 is secured to axle 24 for pivotable movement relative to endless chain 12 between a pushing position extending generally perpendicular to hinge mount 20, to endless chain 12 and to the conveying direction and a non-interfering position. A cam 28 is secured to axle 24 outwardly of hinge mount 20 and push tab 26 and extends generally perpendicularly to axle 24 and push tab 26.

Fixtures F1 and F2 include a chain mount 30 which can be attached to tabs T such as by fasteners 22. Fixture F1 includes a front stop 32 extending generally arcuately from the chain mount 30 forwardly in the conveying direction and upwardly away from the endless chain 12 and configured to accept the arcuate shaped ends of rails R. Front stops 32 includes openings 34 formed therein. Fixture F2 includes a front stop 36 extending generally perpendicular from chain mount 30 and endless chain 12 to the front of chain mount 30 in the conveying direction. Push tabs 26 are spaced from front stops 32 and 36 in the conveying direction and are pivotable relative to endless chain 12 away from front stops 32 and 36. Fixture F3 includes a chain mount 40 which can be attached to tabs T such as by fasteners 22, and can include an arch 42 of a size to receive endless chain 12 when traveling around sprockets 14 and 16. Fixture F3 further includes first and second back stops 44 removably secured to chain mount 40 and extending generally arcuately from chain mount 40 rearwardly in the conveying direction and upwardly away from the endless chain 12 and configured to accept the arcuate shaped ends of rails R. Legs 46 integrally extend perpendicularly from the front edge of chain mount 40 in the conveying direction and away from the endless chain 12. Adjustable bolts 48 are threadably received in legs 46 and extend parallel to the chain mount 40 and the endless chain 12.

It should then be appreciated that rails R can be placed in the conveying mechanism between fixtures F1 and F3 parallel to the conveying direction with the leading portion or ends of rails R received in front stop 32 and the trailing portion or ends of rails R received in back stops 44. Further, the leading edges or sides of spacers S abut with front stops 36 of fixtures F2 and F3, and the trailing edges or sides of spacers S abut with push tabs 26 in the pushing position.

Figure 8:
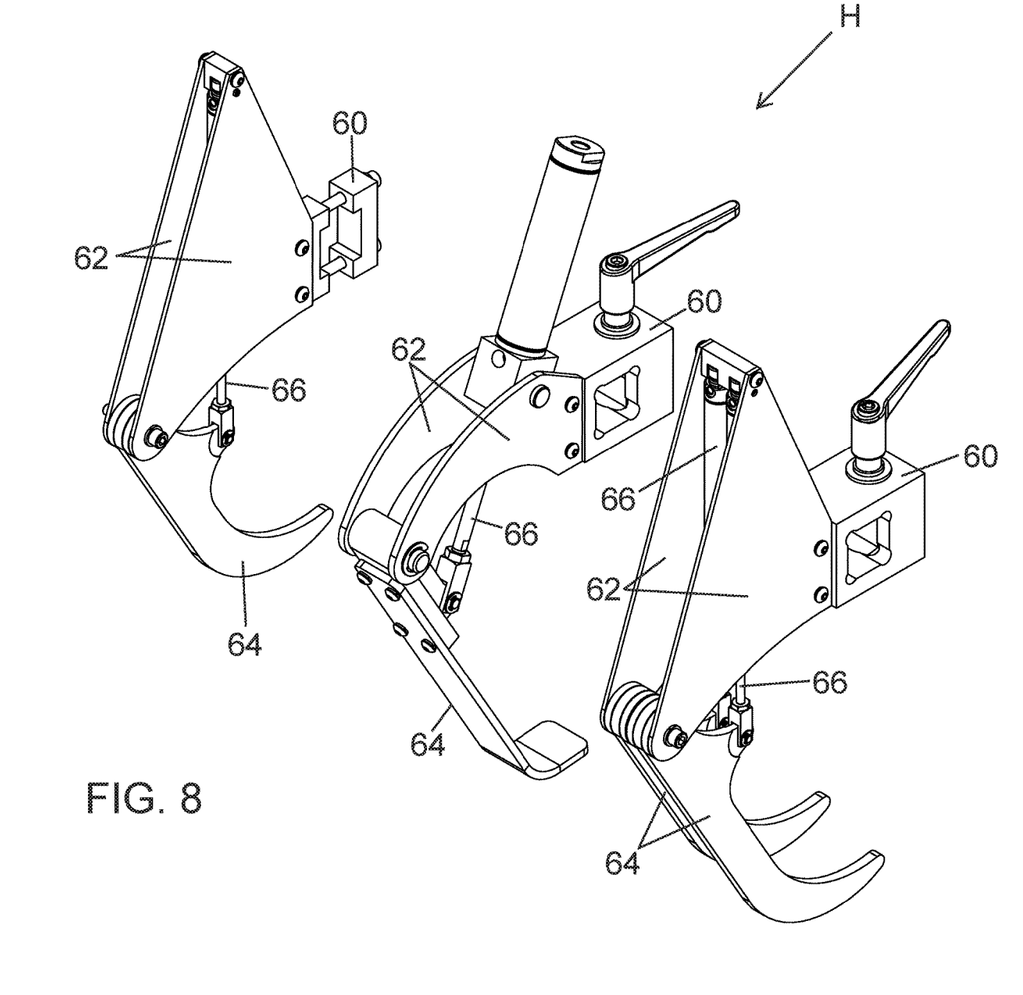
FIGS. 8 and 9 show perspective views of the compressing assembly of apparatus of FIG. 1 with portions broken away and removed.
Figure 9:
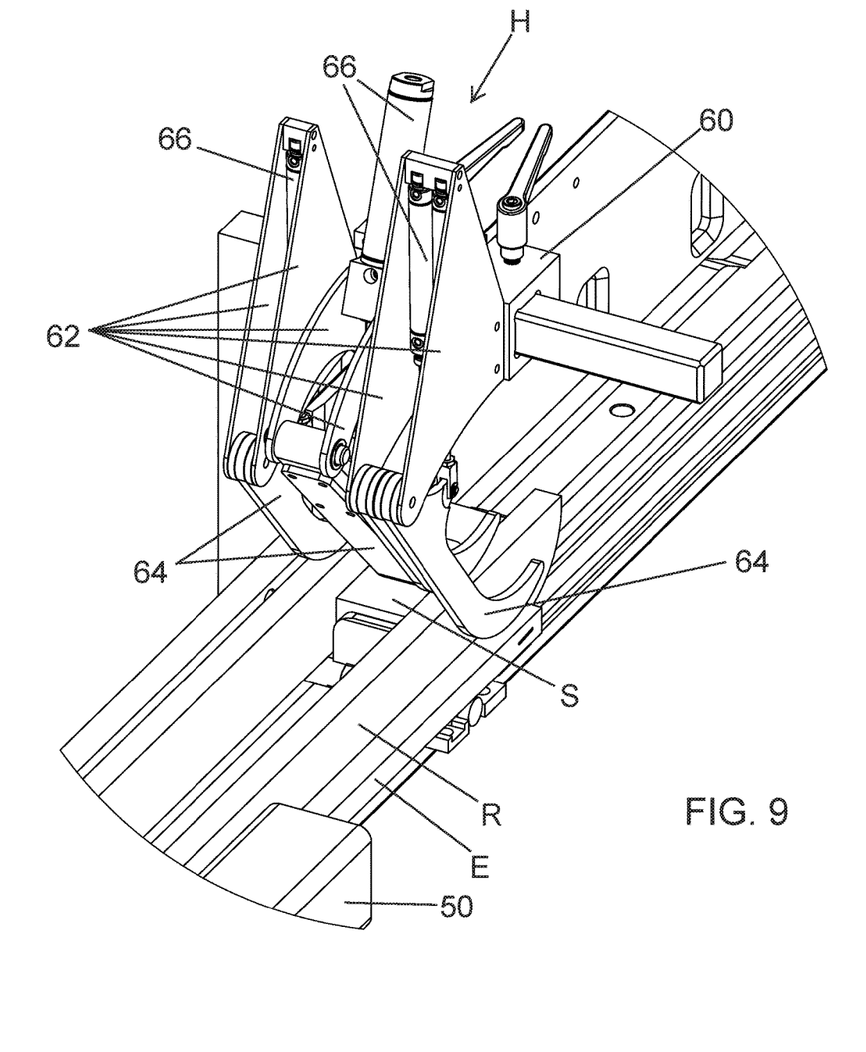

Apparatus 10 further includes compressing assemblies for compressing rails R and spacers S together before fastening. In the form shown, a compression bar 50 extends parallel to the endless chain 12 and the conveying direction and is horizontally movable toward and away from the endless chain 12 generally perpendicular to the conveying direction.

In the form shown, first and second arms 52 extend generally perpendicular to compression bar 50 and are suitably slidably supported to a frame of apparatus 10 such as by slides 52A mounted to apparatus 10. Compression bar 50 is movable perpendicular to the conveying direction between a loading position and a compressed position located closer to the endless chain 12 such as by air cylinders 54 having one end connected to arms 52 and an opposite end connected to the frame of the apparatus 10. In operation, compression bar 50 is located in its loading position and endless chain 12 is positioned with fixtures F2 aligned with magazines M. Spacers S are fed from the magazines M, and rails R are placed between fixtures F1 and F3 by the operator. After placement, compression bar 50 can be moved from its loading position to its compressed position to compress and sandwich rails R against spacers S by retracting air cylinders 54. After and while being compressed, endless chain 12 can be advanced to move the compressed rails R and spacers S toward the staple guns G.

In the form shown, hold downs H are positioned above the endless chain 12 for holding down the rails R and spacers S before entering the staple guns G. Particularly, hold down H can be of a variety of configurations but each include generally a clamp 60 for fixing to the frame of apparatus 10 and include parallel pivot plates 62 secured thereto. At least one claw 64 is pivotably mounted about a pivot axis extending perpendicular to the conveying direction between the pivot plates 62 and is of an extended shape and particularly of a J-shape perpendicular to the pivot axis. Claw 64 extends at a large acute angle in the order of 60° to the conveying direction and includes its upper end pivotably mounted between pivot plates 62 and its lower end extending in the conveying direction. An air spring 66 biases the claw 64 to pivot about the pivot axis in the conveying direction and towards the endless chain 12 and includes a first end connected to pivot plates 62 and a second end connected to claw 64. The width of claws 64 corresponds to the thickness of rails R and spacers S which they engage, with the width of claw 64 which engages spacers S shown as being perpendicular to the thickness of the claw 64 and as being a whole number multiple of widths of claws 64 which engage rails R, whereas the width of claws 64 which engage rails R being the thickness of the claw 64. Thus, as endless chain 12 advances moving the fixtures F1, F2 and F3 and the compressed rails R and spacers S toward the fastening location of staple guns G, rails R and spacers S will push and pivot hold downs H against the bias of the air springs 66, with the second ends of the claws 64 pushing against and sandwiching the rails R and spacers S downward against the fixtures F1, F2 and F3 as the endless chain 12 advances. While being sandwiched, staple gun G drives fasteners, such as staples, to fasten rails R and spacers S together.

Figure 10:
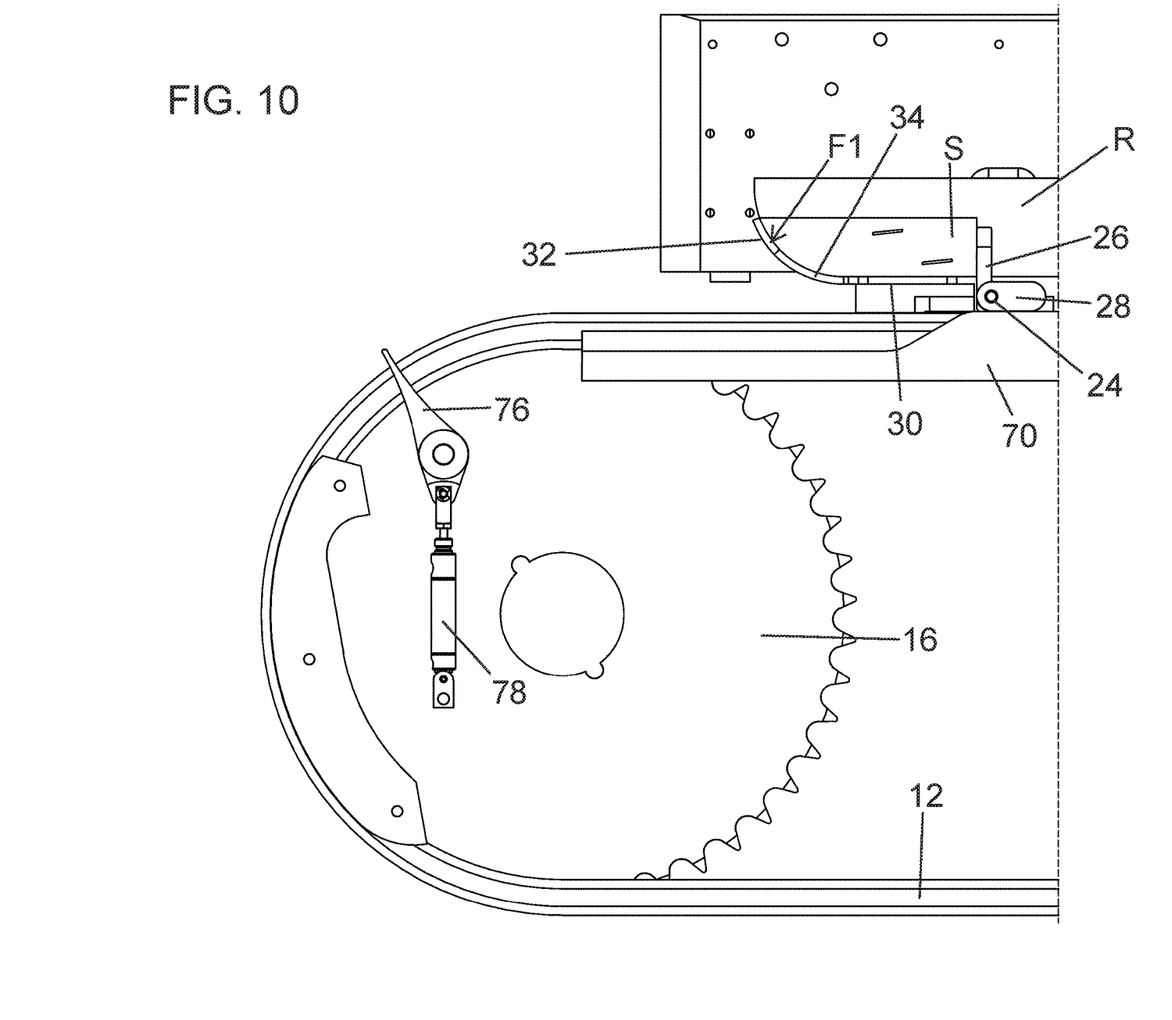
FIGS. 10 and 11 show partial side views of the apparatus of FIG. 1 with portions broken away and removed.
Figure 11:
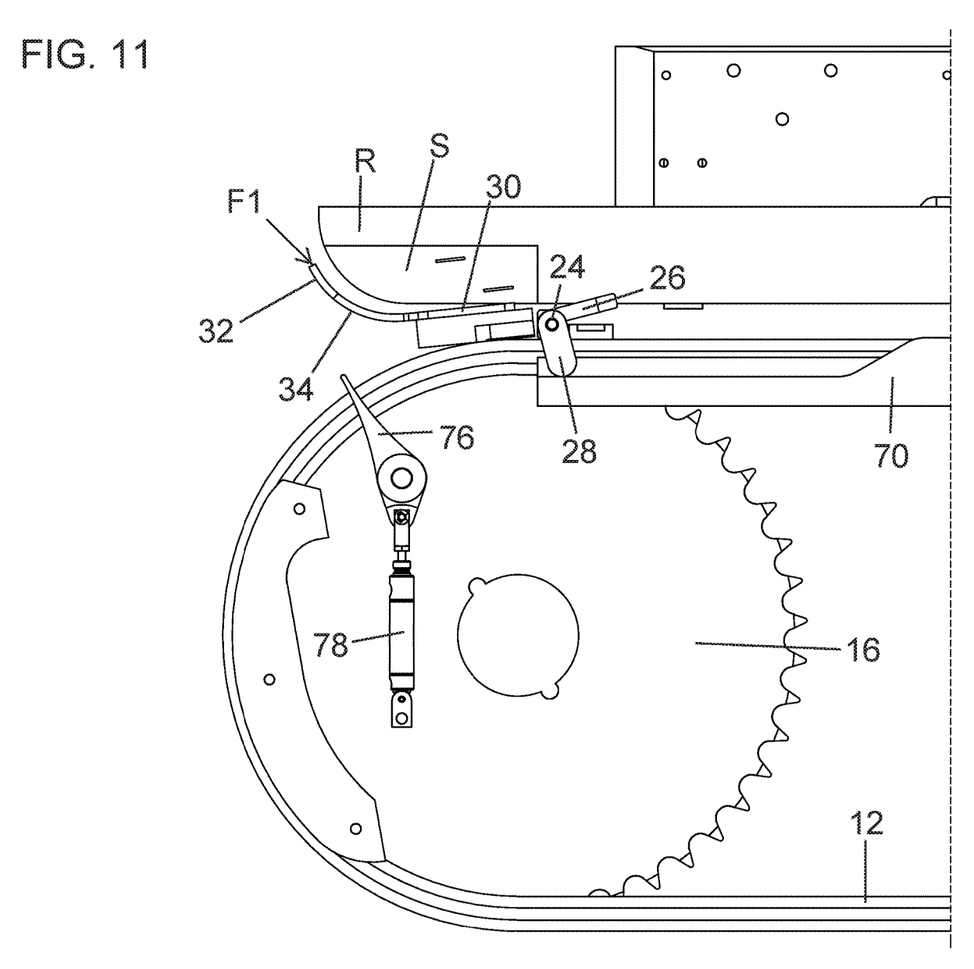

Apparatus 10 further includes a cam track 70 extending parallel to and spaced from the endless chain 12 for engagement by cam 28. Specifically, when cam track 28 engages cam track 70, push tab 26 is held in its pushing position. Cam track 70 terminates before the sprocket 16 in the conveying direction to allow the push tab 26 to move from its pushing position to a non-intervening position with the spacer S after rails R and spacers S are fastened by staple gun G and before reaching sprocket 16. Thus, it is possible for the endless chain 12 to follow sprocket 16 since fixtures F1 and F2 do not have to follow spacers S. Thus, the distance between sprockets 14 and 16 can be reduced to reduce the footprint of the apparatus 10. Suitable provisions can ensure that cam 28 will engage with cam track 70 after fixtures F1 and F2 are below the upper run of the endless chain 12 such as by a pivot trip cog 76 which engages with cams 28 and is biased to its engagement position such as by an air spring 78.

Figure 12:
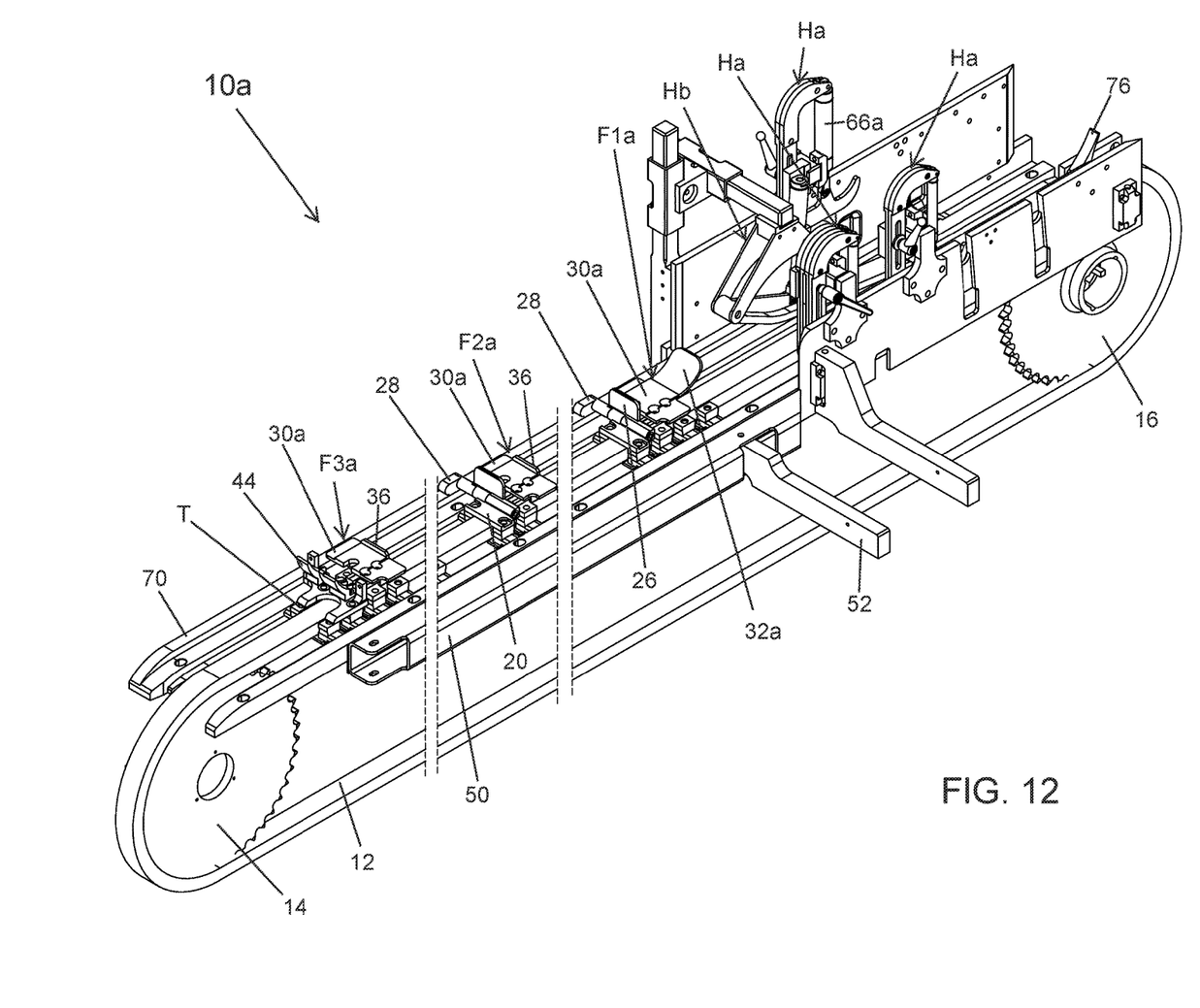
FIG. 12 shows a perspective view of a conveying mechanism of an alternate apparatus for fastening beams for bed foundations, with portions broken away and removed.
Figure 13:
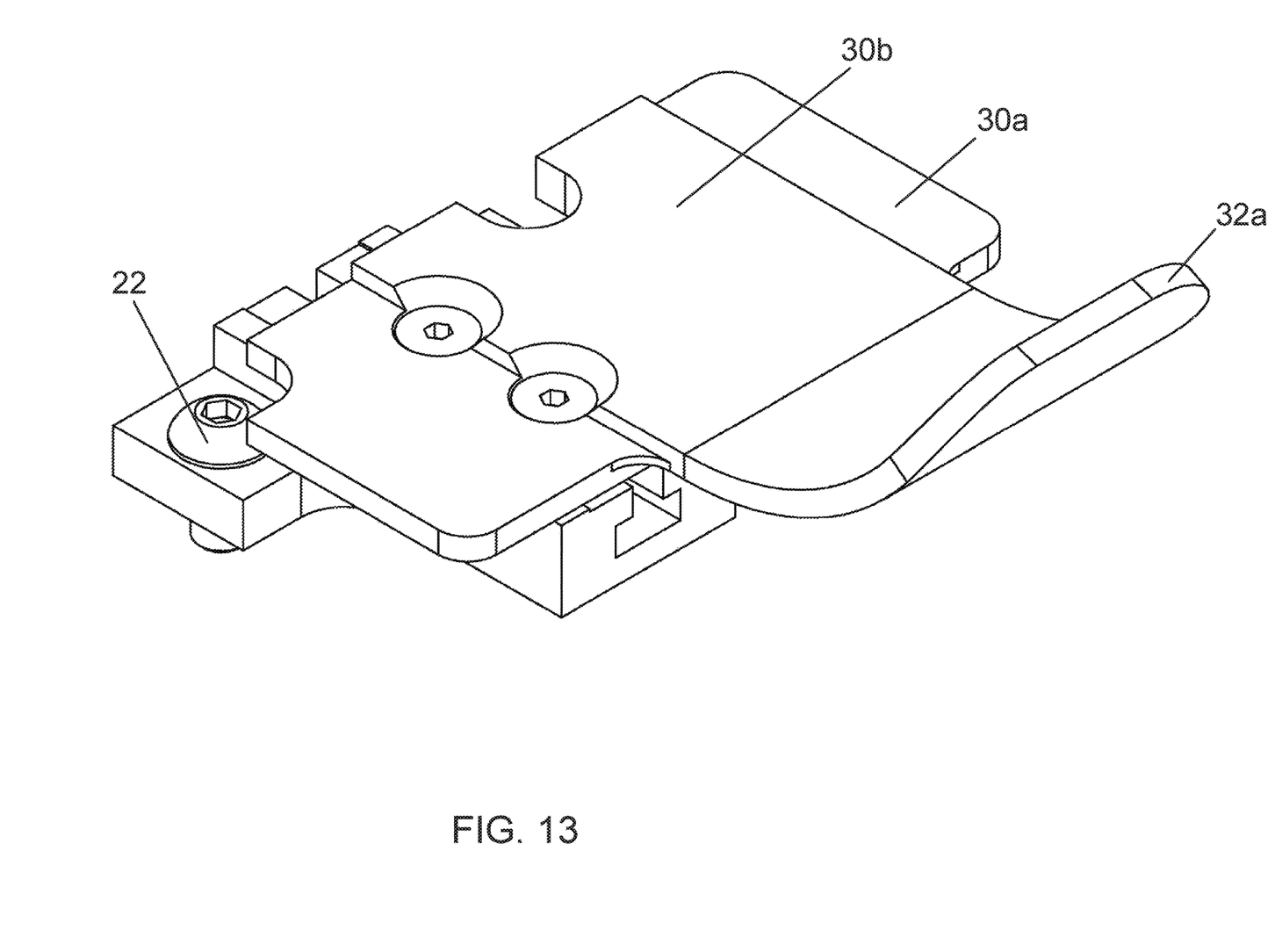
FIGS. 13 and 14 show perpective views of fixture elements of the apparatus of FIG. 12.
Figure 14:
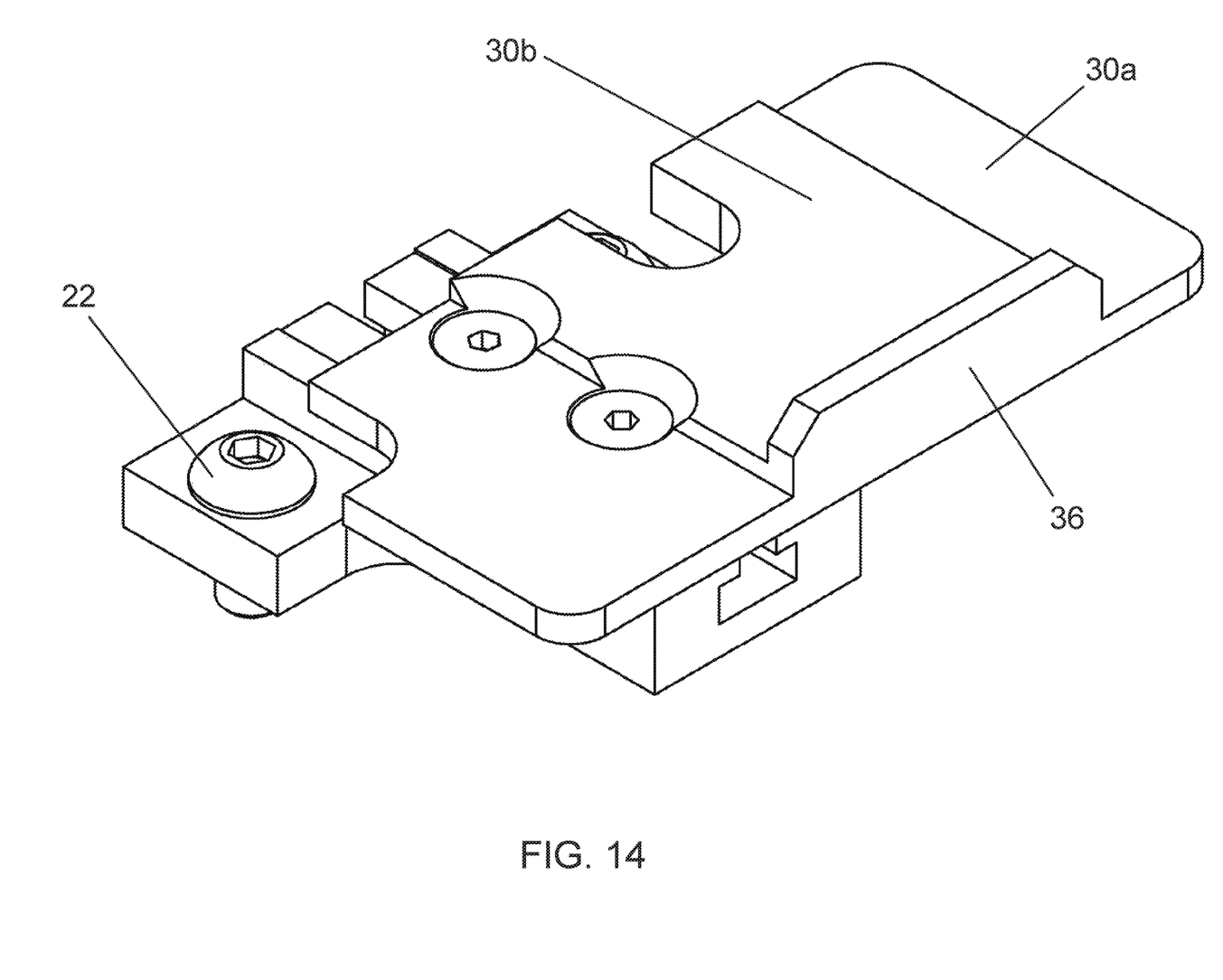

In an alternate form, an apparatus for fastening components and particularly beams for bed foundations is shown and generally designated 10a. Apparatus 10a generally includes a conveyor or conveying mechanism for conveying components in a conveying movement direction shown as an endless chain 12 extending around sprockets 14 and 16. Conveying mechanism further includes fixtures F1a, F2a and F3a attachable to endless chain 12 and spaced in the conveying direction. Fixtures F1a and F2a include a chain mount 30a which can be attached to tabs T such as by fasteners 22. Chain mount 30a includes a step 30b located intermediate and spaced from the side edges thereof. Fixture F1a includes a front stop 32a extending generally arcuately from the chain mount 30a forwardly in the conveying direction and upwardly away from the endless chain 12 and configured to accept the arcuate shaped ends of rails R. Fixture F2a includes a front stop 36 extending generally perpendicular from chain mount 30a and endless chain 12 to the front of chain mount 30a in the conveying direction.

Figure 15:
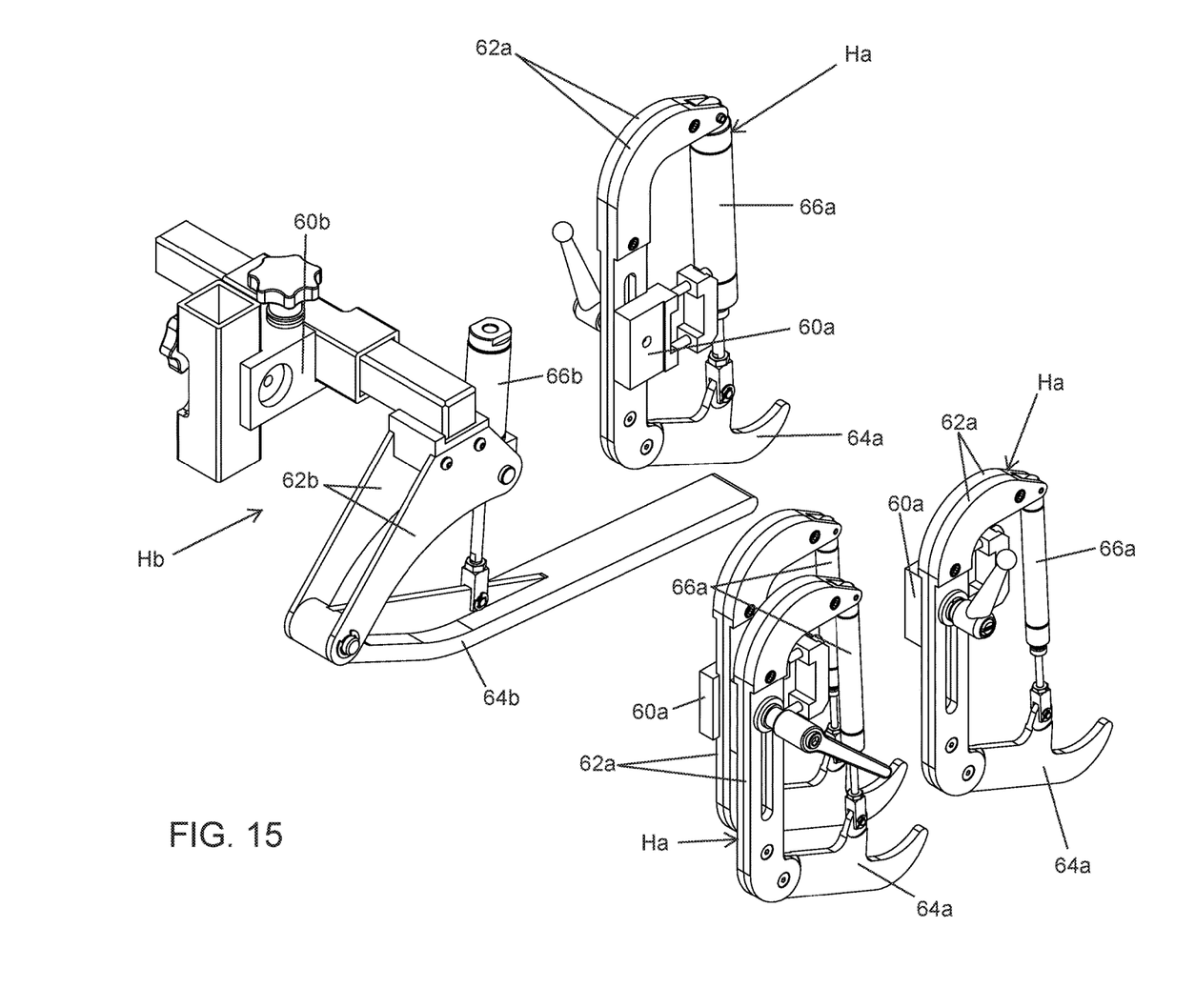
FIGS. 15 and 16 show perspective views of the compressing assembly of the apparatus of FIG. 12.
Figure 16:
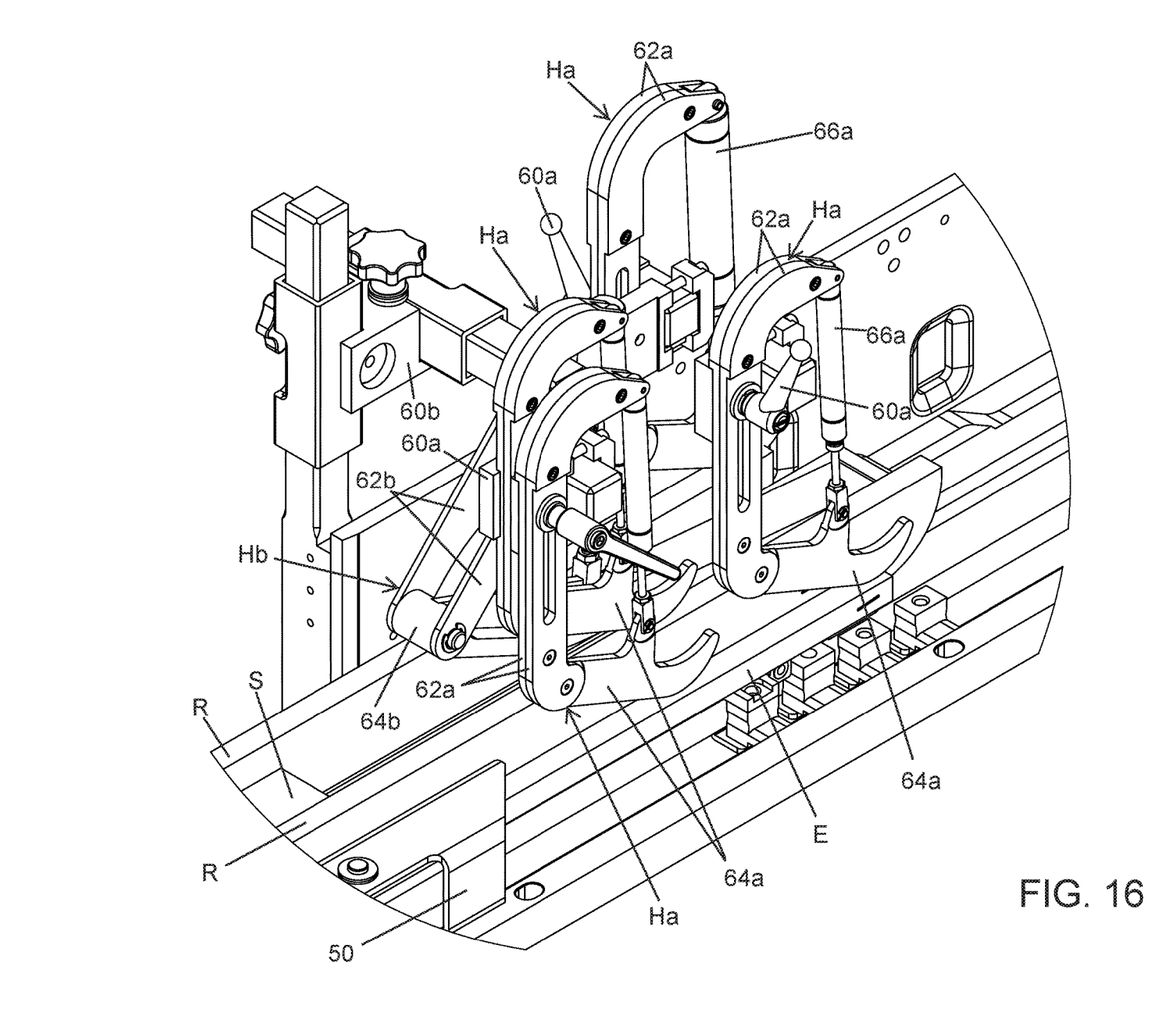

Apparatus 10a further includes hold downs Ha and Hb positioned above the endless chain 12 for holding down the rails R, end stop E and spacers S before entering the staple guns G. Particularly, hold down Ha can be of a variety of configurations but each include generally a clamp 60a for fixing to the frame of apparatus 10a and include parallel pivot plates 62a secured thereto. Pivot plates 62a are generally C-shaped and are sandwiched together with inner notches formed on the ends thereof. A claw 64a is pivotably mounted about a pivot axis extending perpendicular to the conveying direction between the pivot plates 62a and is of an extended shape and particularly of a J-shape perpendicular to the pivot axis. Claw 64 extends at a small acute angle in the order of 15° to the conveying direction and includes its forward, upper end pivotably mounted between pivot plates 62a and its rearward, lower end extending in the conveying direction. An air spring 66a biases the claw 64a to pivot about the pivot axis in the conveying direction and towards the endless chain 62 and includes a first end pivotably connected to pivot plates 62a and a second end connected to claw 64a. The width of claws 64a corresponds to the thickness of rails R and end stop E which they engage. Additionally, hold down Hb can be of a variety of configurations but includes generally a clamp 60b for fixing to the frame of apparatus 10b and includes spaced, parallel pivot plates 62b secured thereto. A claw 64b is pivotably mounted about a pivot axis extending perpendicular to the conveying direction between the pivot plates 62b and is of an elongated shape and particularly of a ski-shape perpendicular to the pivot axis. The tip portion of claw 64b extends at a small acute angle in the order of 15° to the conveying direction, and the trailing portion of claw 64b extends generally parallel to the conveying direction. Claw 64b includes its forward, upper end pivotably mounted between pivot plates 62b and its rear, lower end extending in the conveying direction. An air spring 66b biases the claw 64b to pivot about the pivot axis in the conveying direction and towards the endless chain 62 and includes a first end pivotably connected to pivot plates 62b and a second end connected to claw 64b. The width of claw 64b corresponds to the thickness of spacers S which it engages, with the width of claw 64b which engages spacers S shown as being perpendicular to the thickness of the claw 64b and as being a whole number multiple of widths of claws 64a which engage rails R and end stop E, whereas the width of claws 64a which engage rails R and end stop E being the thickness of the claw 64a. Thus, as endless chain 12 advances moving the fixtures F1a, F2 and F3a and the compressed rails R, end stop E and spacers S toward the fastening location of staple guns G, rails R, end stop E and spacers S will push and pivot hold downs Ha and Hb against the bias of the air springs 66a and 66b, with the second ends of the, claws 64a and 64b pushing against and sandwiching the rails R, end stop E and spacers S downward against the fixtures F1a, F2 and F3a as the endless chain 12 advances.

Thus, since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. Apparatus for fastening components comprising, in combination: an endless chain moveable in a conveying direction to extend around a sprocket; a first fixture secured to the endless chain, with the first fixture including a front stop and a back stop spaced from the front stop in the conveying direction and pivotable about a fixture axis relative to the endless chain away from the front stop, with the front stop adapted to abut with a leading portion of the components and with the back stop extending perpendicular to the endless chain and the conveying direction and adapted to abut with a trailing portion of the components; and a gun adapted to drive fasteners into the components, with the back stop pivotable to an acute angle relative to the endless chain intermediate the gun and the sprocket;

The apparatus further comprising, in combination: a cam track extending parallel to and spaced from the endless chain, wherein the first fixture includes an axle fixed to the backstop and defining the fixture axis and a cam secured to the axle and extending generally perpendicular to the fixture axis, with the cam engaging the cam track and pivoting the back stop relative to the endless chain.

2. The apparatus of claim 1, wherein the endless chain includes a tab, wherein the first fixture comprises a hinge mount including the axle, with the hinge mount removably attached to the tab; and a chain mount including the front stop, with the chain mount separately formed from the hinge mount and removably attached to the tab.

3. The apparatus of claim 2, wherein the components comprises first and second rails extending parallel to the conveying direction and spacers perpendicular to the conveying direction and between the first and second rails, with one of the spacers including the leading and trailing portions, wherein the front stop comprises a tab integrally formed with the chain mount and extending perpendicular to the endless chain and the conveying direction and parallel to the back stop extending perpendicular to the endless chain and the conveying direction.

4. The apparatus of claim 2, wherein the components comprises first and second rails extending parallel to the conveying direction and spacers perpendicular to the conveying direction and between the first and second rails, with one of the spacers including the trailing portion, with the first and second rails including the leading portion, wherein the front stop extends generally arcuately from the chain mount forwardly in the conveying direction and upwardly away from the chain mount and the endless chain, with the front stop configured to abut with the leading portion of the first and second rails; wherein the apparatus further comprises a second fixture on the endless chain spaced in the conveying direction for a spacing, with the second fixture including an abutment stop extending arcuately rearwardly in the conveying direction and upwardly away from the endless chain, first and second legs extending perpendicularly to and away from the endless chain, and adjustable bolts threadedly received in the legs and extending parallel to the endless chain, with the front and abutment stops adapted to accept opposite ends of the first and second rails.

5. The apparatus of claim 4, further comprising, in combination a third fixture including a front stop and a back stop spaced from the front stop in the conveying direction and pivotable about a fixture axis relative to the endless chain away from the front stop, with the front stop of the third fixture adapted to abut a leading edge of one of the spacers, with the back stop of the third fixture extending perpendicular to the endless chain and the conveying direction and adapted to abut with a trailing edge of the one of the spacers.

\* \* \* \* \*